(12) United States Patent
Auxier et al.

(10) Patent No.: US 9,897,892 B2
(45) Date of Patent: Feb. 20, 2018

(54) NON-MECHANICAL BEAM STEERING TRACKING SYSTEM

(71) Applicants: Jason Auxier, Falls Church, VA (US); Christopher Dunay, Pomfret, MD (US); Myron R. Pauli, Fairfax, VA (US)

(72) Inventors: Jason Auxier, Falls Church, VA (US); Christopher Dunay, Pomfret, MD (US); Myron R. Pauli, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 164 days.

(21) Appl. No.: 14/202,302

(22) Filed: Mar. 10, 2014

(65) Prior Publication Data

US 2015/0378242 A1    Dec. 31, 2015

Related U.S. Application Data

(60) Provisional application No. 61/783,008, filed on Mar. 14, 2013.

(51) Int. Cl.
| | |
|---|---|
| *G02F 1/29* | (2006.01) |
| *G02F 1/295* | (2006.01) |
| *G02F 1/13* | (2006.01) |
| *G02F 1/1347* | (2006.01) |
| *G02F 1/01* | (2006.01) |
| *G02B 6/27* | (2006.01) |

(52) U.S. Cl.
CPC ........... *G02F 1/292* (2013.01); *G02B 6/2753* (2013.01); *G02F 1/0118* (2013.01); *G02F 1/1326* (2013.01); *G02F 1/1347* (2013.01); *G02F 1/29* (2013.01); *G02F 1/295* (2013.01); *G02F 2001/291* (2013.01)

(58) Field of Classification Search
None
See application file for complete search history.

(56) References Cited

U.S. PATENT DOCUMENTS 8,311,372 B2 * 11/2012 Anderson ............... G02F 1/295
349/21
2012/0081621 A1 * 4/2012 Dorschner .............. G02F 1/292
349/1

* cited by examiner

*Primary Examiner* — Michelle R Connelly
(74) *Attorney, Agent, or Firm* — US Naval Research Laboratory; Richard F. Bis

(57) ABSTRACT

A non-mechanical optical beam steering device includes one or more polarization gratings (PG) coupled to one or more Steerable Electro-Evanescent Optical Refractors (SEEOR). It provides the coarse steering advantage of the PG and also the continuous fine steering advantage of the SEEOR. The result is far less complexity, size, weight, and cost over the alternative non-mechanical beam steering approaches as well as considerably less complexity, size, weight, cost, scanning-time, and mechanical breakdown over the more traditional gimbaled mirrors commonly used.

19 Claims, 3 Drawing Sheets

NON-MECHANICAL BEAM STEERING TRACKING SYSTEM

CROSS-REFERENCE TO RELATED APPLICATIONS

This Application claims the benefit of U.S. Provisional Application 61/783,008 filed on Mar. 14, 2013 and incorporated herein by reference.

FIELD OF THE INVENTION

The invention is directed to a non-mechanical beam steering tracking system (NMBS), and more particularly to an NMBS combining a steerable electro-evanescent optical refractor and polarization gratings.

BACKGROUND OF THE INVENTION

Commercial and Military Laser devices generally use mechanically controlled (gimbaled) mirrors to aim, steer, and scan laser beams. Such mechanically controlled systems have several disadvantages: (1) weight, (2) size, (3) power consumption, (4) mechanical breakdown, and (5) time delays in steering. Considerable resources have been spent by commercial and military research to find acceptable alternatives to this gimbaled approach which can also cover wide fields of regard with high accuracy "fine" beam pointing.

Two promising approaches to eliminate the mechanical gimbals have been developed in the last decade. One approach uses a Steerable Electro-Evanescent Optical Refractor (SEEOR) continuous steerer for fine beam control, e.g. as described in U.S. Pat. No. 8,311,372, Anderson et al., issued Nov. 13, 2012, and U.S. Pat. No. 8,463,080, Anderson et al., issued Jun. 11, 2013, both of which are incorporated herein by reference. The other approach, described in J. Kim, C. Oh, M. J. Escuti, L. Hosting, and S. A. Serati, "Wide-angle, nonmechanical beam steering using thin liquid crystal polarization gratings," *Advanced Wavefront Control: Methods, Devices, and Applications VI* (SPIE, 2008) (the "PG approach"), employs a series of polarization gratings ("PG"s) to discretely cover a wide field of regard. Each of these techniques, however, have limitations to completely (continuously) cover a wide field of regard with no dead spots. The SEEOR approach requires an enormous number of liquid crystal prisms to cover a wide field of regard although each SEEOR refractor does an excellent job of fine beam control within a narrower field of regard (as much as 60°×15°) The PG approach easily obtains a wide field of regard but requires many layers to get to high resolution fine tracking since it discretely splits the field of regard in two—hence 12 PG layers will get 4096 fine-resolution beam positions.

BRIEF SUMMARY OF THE INVENTION

According to the invention, a non-mechanical optical beam steering device includes one or more polarization gratings (PG) coupled to one or more Steerable Electro-Evanescent Optical Refractors (SEEORs).

The invention provides the coarse steering advantage of the PG and also the continuous fine steering advantage of the SEEOR. The result of using the invention is far less complexity, size, weight, and cost over the alternative non-mechanical beam steering approaches as well as considerably less complexity, size, weight, cost, scanning-time, and mechanical breakdown over the more traditional gimbaled mirrors commonly used.

To achieve a hemispherical laser beam pointer with SEEOR only would likely require at least 48 SEEOR devices. To achieve milliradian precision pointing with PG only would likely require at least 26 PG devices. The combined integrated approach of the invention provides the same precision fine pointing and wide field of regard to be obtained but employing far less hardware, e.g. 6 PG's and a single SEEOR. Mechanical gimbals as an alternative have the disadvantages of much greater size, weight, power consumption, and scanning time.

DETAILED DESCRIPTION OF THE INVENTION

Figure 1:
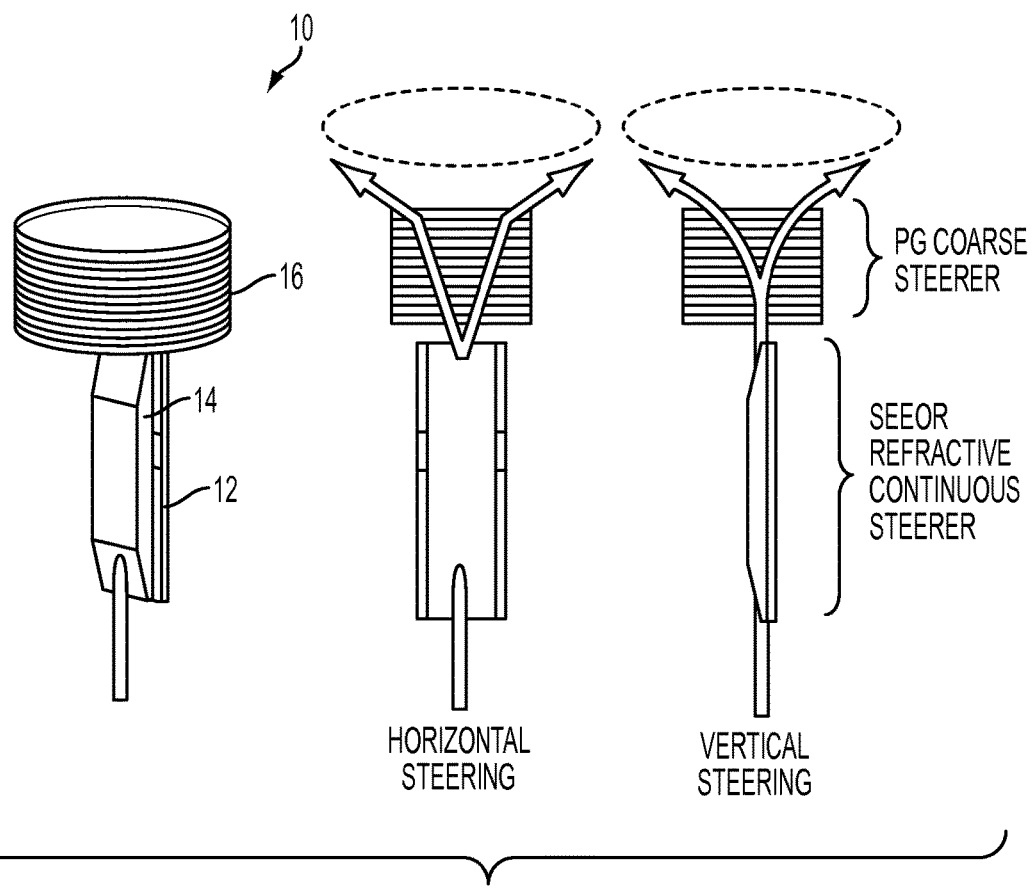
FIG. 1 is a non-mechanical beam steering tracking system ("NMBS"), next to a US quarter on the left shown for scaling, according to the invention.

Referring now to FIG. 1 showing one embodiment of the invention, a non-mechanical beam steering tracking system ("NMBS") 10 couples a continuous steering component 12, consisting of a compact liquid crystal (LC)-clad optical waveguide 14, to a coarse steering polarization grating (PG) 16 to create a purely electro-optic (EO) steerer exceling in throughput, field-of-regard (FOR), scanning time, and clear aperture. The former technology is ideal for compact, rapid continuous steering while the latter technology is most favorable for discrete steering to access large FORs. The preferred embodiment of the NMBS 10 is to propagate and send a laser beam through the optical waveguide 14 covering 60°×15° and then into a coarse steering PG stack to address the full FOR.

Figure 2:
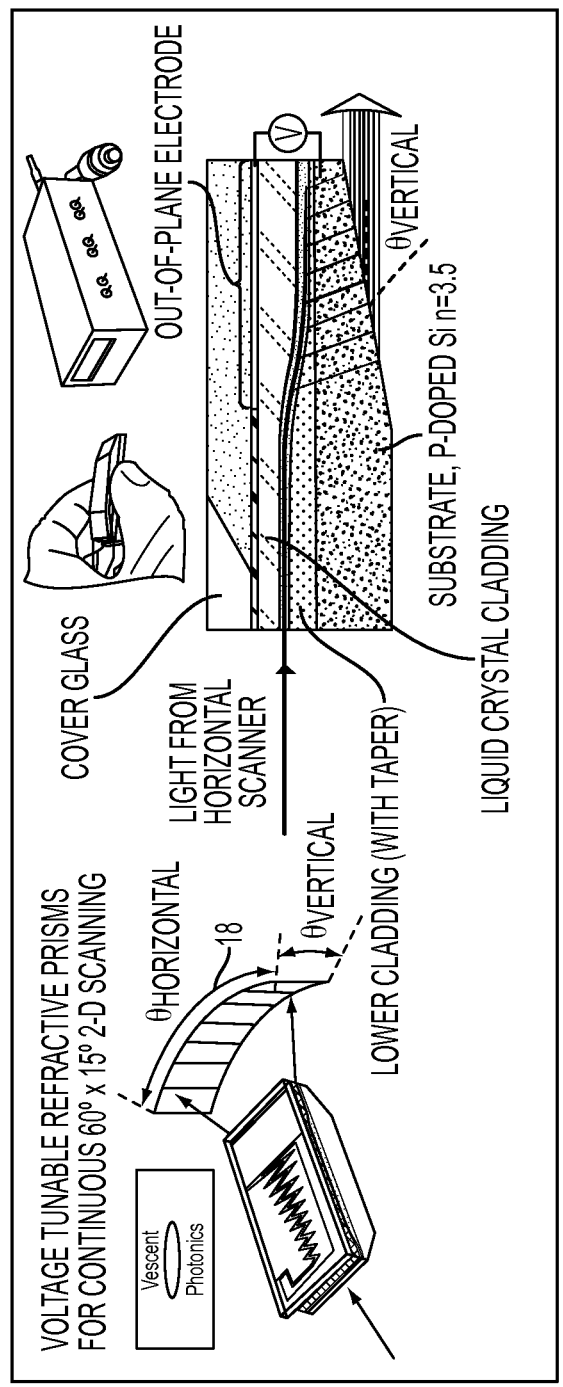
FIG. 2 is a Steerable Electro-Evanescent Optical Refractor (SEEOR)

The continuous steering component 12 can be a Steerable Electro-Evanescent Optical Refractor (SEEOR) as shown in FIG. 2, which provides the giant electro-optic phase control (>2 mm) provided by LC-clad optical waveguides and makes possible unprecedented refractive EO scanners. The light is steered via a voltage tunable Snell's law refraction, either with one or more prism electrodes (horizontal) or an electrode and out-coupling prism (vertical). The light input and output is a collimated beam. For SWIR operation, Vescent Photonics has recently demonstrated: i) 270° 1-D; ii) 50°×15° 2-D; iii) high speed (60 kHz); and iv) large aperture (1.2 cm) NMBS. SEEORs are compact (~6 cm$^3$), low power (only tens of μWatts), and simple (only 3 electrodes).

In the LC-clad architecture (lower right of FIG. 2), the evanescent field of the waveguide mode interacts with the surface-layer LC molecules. Horizontal beam steering is achieved by prism shaped electrodes 18 whose index may be voltage tuned (lower left of FIG. 2). Vertical beam steering is achieved by allowing the evanescent field to tunnel into the high-index substrate (high index glass for λ<1.2 μm) by tapering the subcladding. An S-taper provides a Gaussian output with a mode-quality factor of M$^2$~1. The output angle $\theta_{vertical}$ may be voltage tuned through a final electrode. This provides 2-D tunable refraction of 60°×15° FOR with a 1-mrad divergent beam.

Figure 3:
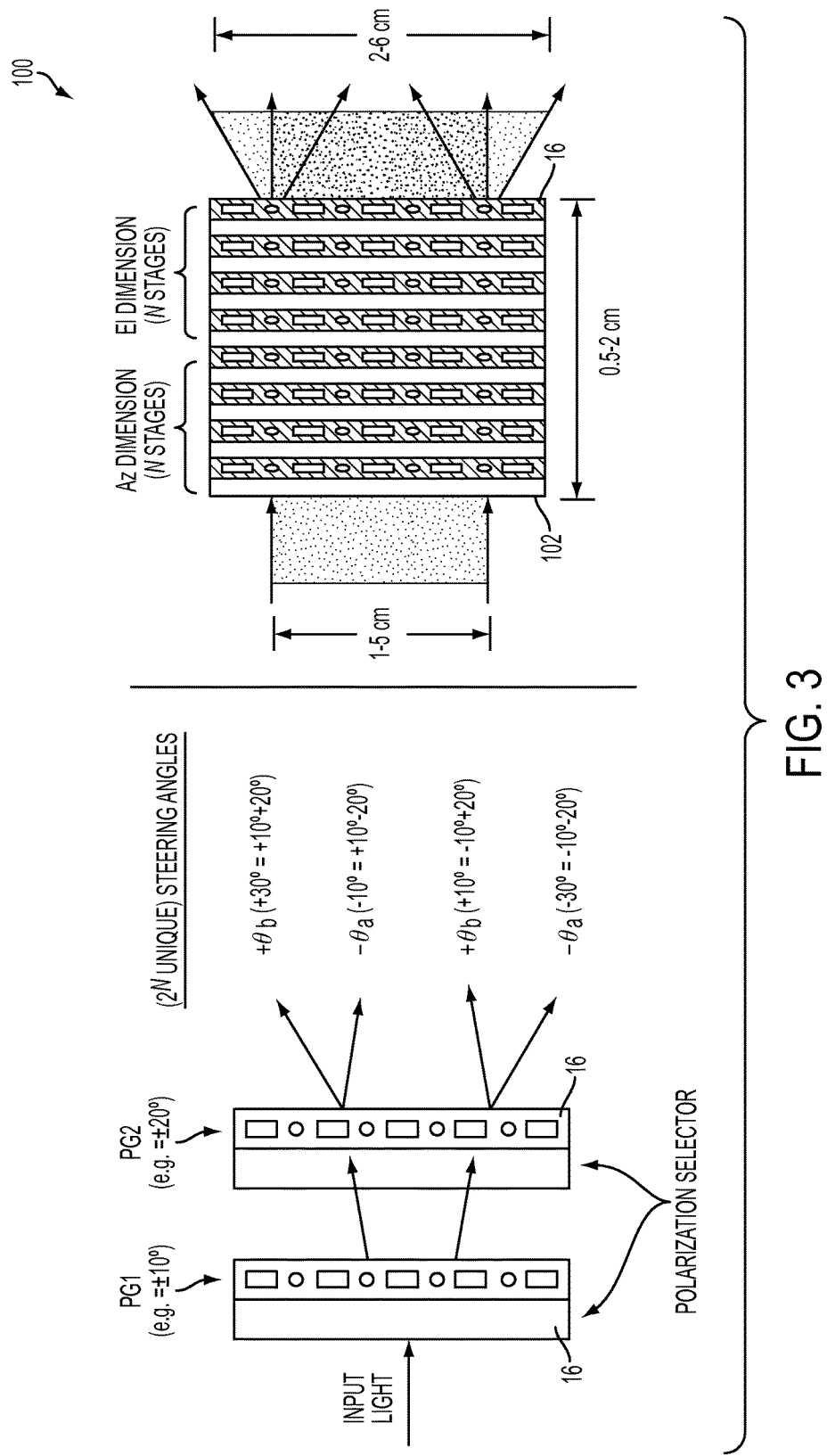
FIG. 3 is a discrete steerer component consisting of a stack of polarization gratings PGs according to the invention.

In an embodiment of the invention shown in FIG. 3, a discrete steerer component 100 includes a stack 102 of PGs 16, with each PG 16 preferably a highly efficient diffraction grating consisting of nematic liquid crystals that is effective as a thin-film polarizing beam-splitter. Exemplary PGs 16 are described in U.S. Patent Application Publication No. 20120188467, "Beam Steering Devices Including Stacked Liquid Crystal Polarization, Gratings And Related Methods Of Operation", Escuti et al., Jul. 26, 2012 ("Escuti et al."), incorporated herein by reference (e.g., see Escuti et al., FIGS. 6-7 and the related description at paras. [0107]-[0111]).

The diffraction efficiency spectra, polarization behavior, and angular sensitivity of PGs are notably different than conventional phase or amplitude gratings. As thin-film polarizing beam-splitters, PGs angularly separate incident light into two, forward-propagating, orthogonal, circular polarizations and diffract~100% into a single direction when the input is circularly polarized. One of the best features of the PG approach is its exponential increase in the number of steering directions when multiple stages are stacked. If N total stages are employed for each dimension, then a total of $2^N$ angles can be addressed in each dimension. Each stage magnifies the FOR accessibility from the continuous scanner, thus building up the full desired FOR (one example may be) 120°×120°. The PG approach to coarse steering offers substantial throughput of >80% (a recent breakthrough), the widest 2-D FOR currently known to our team (80°×80°), and easily scalability to higher beam diameters (currently>8 in.). Furthermore, a PG approach allows for imaging through the system—a significant advantage for transceiver applications.

In an embodiment of the invention shown in FIG. 3 is a non-mechanical optical beam steering device, comprising of one or more polarization gratings (PG) coupled to one or more Steerable Electro-Evanescent Optical Refractors (SEEOR). This invention could operate in one or multiple electromagnetic wavelengths ranging from the Ultraviolet through the far-Infrared as appropriate for the materials used in the PG and SEEOR components for any total field of regard up to complete spherical coverage. This invention could be used in a device as an optical (or laser) transmitter, receiver, or transceiver. For scanning methods of the invention, the device could be commanded to point-to-a-specific-angle or in a pre-programmed scanning mode. Additionally, the invention could be coupled to any input/output instantaneous field of view for incoming light or laser beam divergence being emitted from the non-mechanical beam steerer and be coupled to any light detector.

Transmitter methods include optical (or laser) illuminator, designator, or pointer. Some illuminators or pointers may be used in an optical detection system; an active (2D or 3D) imaging system; an image, slide, video (movie), or scene projector; or as a scanner for laser lighting displays or laser light shows.

Transceiver or transmitter plus receiver methods include laser rangefinder (or altimeter); laser or optical tracker; LIDAR or LADAR system; chemical, biological, or explosive detection system; remote sensing system; free-space optical communications system; an optical augmentation system a laser-based linear (1D) or matrix (2D) barcode scanner, for example, universal product code (UPC) or Quick Response (QR) Code, respectively; laser 3D scanners for collecting data constructing three-dimensional models for prototyping, reverse engineering, industrial design, orthotics, dental implants, dental orthodontics, prosthetics, medical devices, and other 3D printing applications; product inspection devices, non-destructive testing systems, quality control devices, or devices to document cultural artifacts; an optical profilometer or optical metrology system; an adaptive optics system.

Receiver methods include passive optical detection devices, imagers, optical trackers, scanning or push-broom imagers, and passive linear (1D) or matrix (2D) barcode scanner, for example, universal product code (UPC) or Quick Response (QR) Code, respectively.

An analysis of the capabilities of this invention compared with earlier DARPA work (link: h http://bnonlinear.com/products/linear-series-liquid-crystal-spatial-light-modulator) and mechanical gimbals for a 120°×120° FOR is summarized in Table 1:

TABLE 1

| Attribute | SEEOR + PG | OPA + Birefringent Prisms. | Gimbal |
| --- | --- | --- | --- |
| Total FOR | 120° × 120° | 120° × 120° | 120° × 120° |
| Fine Steerer FOR | 60° × 15° | 6° × 6° | 120° × 120° |
| Coarse Stages | 4 | 10 | 0 |
| Power in Side-Lobes | <1% | Appreciable | None |
| Dispersion Across λ Band | Minimal | Significant | None |
| Size | 2 × 2 × 8 cm | 10 × 10 × 30 cm | 10 × 10 × 25 cm |
| Weight | <50 g | <400 g | >10 kg |
| Beam Steering Power | Few milliWatts | 10s milliWatts | >10 Watts |
| Conformal | YES | YES | NO |
| Pointing Precision | <20 µrad | 5 mrad with Dead spots | 0.3 mrad |
| # of Trans Electrodes | 8 | 12 | 0 |
| Continuous Coverage | YES | NO | YES |
| # Electrodes | 7 | 11 + LCOS OPAs | 4 |
| Point-to-Point transition | 0.5-1 ms | 5-30 ms | 300 ms |
| Frame Time (1000 × 1000) | ~1 s | 1 to 8 hours | 5-10 min |

The NMBS has a number of potential applications. It may be used as a laser transmitter, a two-way laser transceiver, a passive optical device, in one or more electromagnetic wavelengths ranging from the Ultraviolet through the far-Infrared as appropriate for the materials used in the PG and SEEOR components, for any total field of regard up to complete spherical coverage, in a commanded point-to-a-specific-angle or in a pre-programmed scanning mode, any combinations of devices to cover more than one waveband, and for any input/output instantaneous field of view for incoming light or laser beam divergence being emitted from the non-mechanical beam steerer when used in operational modes such as the laser transmitter, two-way laser transceiver, and passive optical device.

Obviously many modifications and variations of the present invention are possible in the light of the above teachings. It is therefore to be understood that the scope of the invention should be determined by referring to the following appended claims.

What is claimed as new and desired to be protected by Letters Patent of the United States is:

1. A non-mechanical optical beam steering device, comprising:
   one or more polarization gratings (PG) coupled to one or more Steerable Electro-Evanescent Optical Refractors (SEEOR),
   wherein the field of regard is greater than 60° by 15°.

2. The device in claim 1, where a single or multiple laser line(s) passes through the device in either direction.

3. The device in claim 1, where a broad waveband of unspecified optical width passes through the device in either direction.

4. The device in claim 1 when used as a laser or optical transmitter.

5. The device in claim 1 when used as a two-way laser or optical transceiver.

6. The device in claim 1 when used as a laser or optical receiver.

7. The non-mechanical optical beam steering device of claim 1, wherein the field of regard is greater than or equal to 80° by 80°.

8. A method for non-mechanical optical beam steering, comprising:
   providing a steerable electro-evanescent optical refractor (SEEOR);
   coupling the SEEOR to polarization gratings; and
   using the SEEOR coupled with the polarization gratings for non-mechanical beam steering;
   wherein the field of regard is greater than 60° by 15°.

9. The method of claim 8, further comprising using the SEEOR coupled with the polarization gratings as in one or multiple electromagnetic wavelengths ranging from the Ultraviolet through the far-Infrared as appropriate for the materials used in the PG and SEEOR components for any total field of regard up to complete spherical coverage.

10. The method of claim 8, further comprising using the SEEOR coupled with the polarization gratings whether used in a commanded point-to-a-specific-angle or in a pre-programmed scanning mode.

11. The method of claim 8, further comprising using the SEEOR coupled with the polarization gratings for any input/output instantaneous field of view for incoming light or laser beam divergence being emitted from the non-mechanical beam steerer.

12. A method for non-mechanical optical imager, comprising:
    providing a steerable electro-evanescent optical refractor (SEEOR);
    coupling the SEEOR to polarization gratings; and
    using the SEEOR coupled with the polarization gratings for non-mechanical beam steering;
    wherein the field of regard is greater than 60° by 15°.

13. The method of claim 12, further comprising using the SEEOR coupled with the polarization gratings as in one or multiple electromagnetic wavelengths ranging from the Ultraviolet through the far-Infrared as appropriate for the materials used in the PG and SEEOR components for any total field of regard up to complete spherical coverage.

14. The method of claim 12, further comprising using the SEEOR coupled with the polarization gratings whether used in a commanded point-to-a-specific-angle or in a pre-programmed scanning mode.

15. The method of claim 12, further comprising using the SEEOR coupled with the polarization gratings for any input/output instantaneous field of view for incoming light or laser beam divergence being emitted from the non-mechanical beam steerer.

16. A method for non-mechanical optical transceiver, comprising:
    providing a steerable electro-evanescent optical refractor (SEEOR);
    coupling the SEEOR to polarization gratings; and
    using the SEEOR coupled with the polarization gratings for non-mechanical beam steering used in a two way (input-output) optical path; that is, both transmitting and receiving light;
    wherein the field of regard is greater than 60° by 15°.

17. The method of claim 16, further comprising using the SEEOR coupled with the polarization gratings as in one or multiple electromagnetic wavelengths ranging from the Ultraviolet through the far-Infrared as appropriate for the materials used in the PG and SEEOR components for any total field of regard up to complete spherical coverage.

18. The method of claim 16, further comprising using the SEEOR coupled with the polarization gratings whether used in a commanded point-to-a-specific-angle or in a pre-programmed scanning mode.

19. The method of claim 16, further comprising using the SEEOR coupled with the polarization gratings whether used in a commanded point-to-a-specific-angle or in a pre-programmed scanning mode.

* * * * *